May 22, 1934.  H. E. IVES  1,960,011
APPARATUS FOR MAKING STEREOSCOPIC PARALLAX PANORAMAGRAMS
Filed Feb. 26, 1931  2 Sheets-Sheet 1
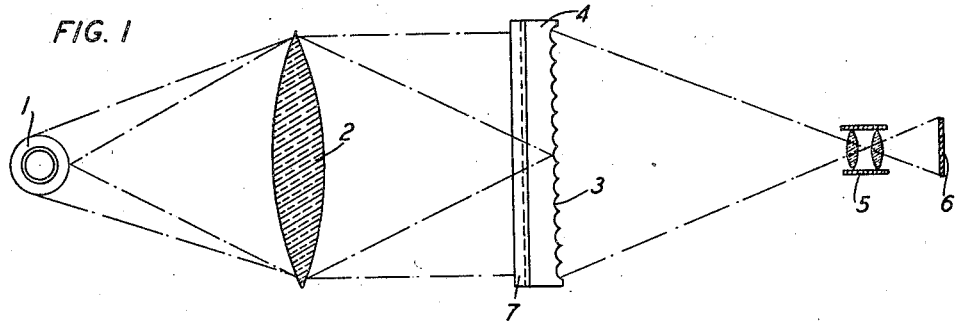
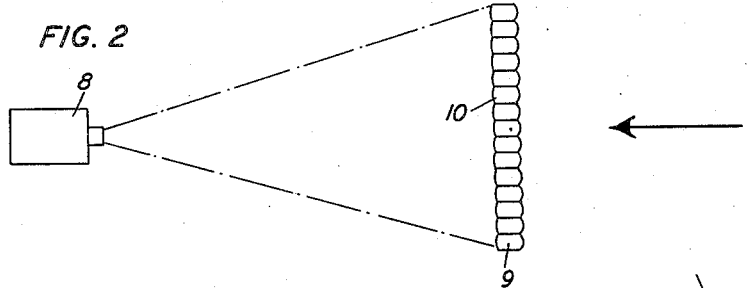
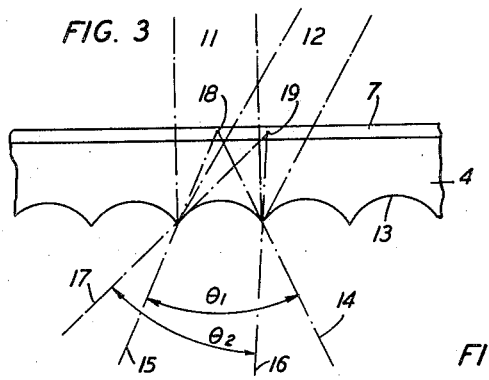
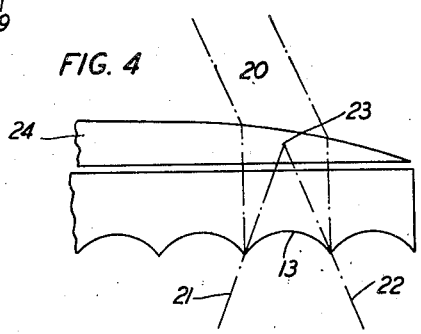
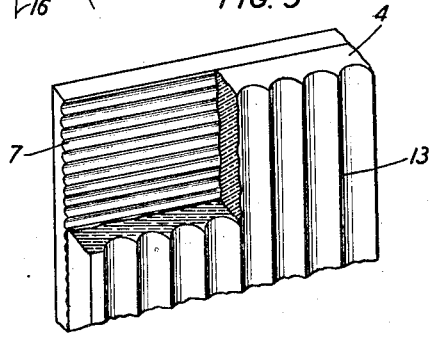
INVENTOR
H.E. IVES
BY
Stanley B. Kent
ATTORNEY May 22, 1934.    H. E. IVES    1,960,011
APPARATUS FOR MAKING STEREOSCOPIC PARALLAX PANORAMAGRAMS
Filed Feb. 26, 1931    2 Sheets-Sheet 2

INVENTOR
H. E. IVES
BY
Stanley B. Kent.
ATTORNEY

Patented May 22, 1934

1,960,011

UNITED STATES PATENT OFFICE 1,960,011

APPARATUS FOR MAKING STEREOSCOPIC PARALLAX PANORAMAGRAMS

Herbert E. Ives, Montclair, N. J., assignor to Bell Telephone Laboratories, Incorporated, New York, N. Y., a corporation of New York Application February 26, 1931, Serial No. 518,334

13 Claims. (Cl. 88—16.6)

This invention relates to the producing of pictures in stereoscopic relief and more particularly to producing stereoscopic parallax panoramagrams which on projection present pictures in stereoscopic relief.

An object of the invention is to provide an arrangement for taking at a single relatively short exposure a stereoscopic parallax panoramagram picture.

The invention is applicable to either still or motion pictures.

In one arrangement illustrative of the invention, a large diameter lens is positioned to focus an image of a desired object upon a screen or grating, such as a sheet of glass or celluloid, which has one smooth flat surface and an opposite ridged surface formed by a series of parallel concave cylindrical grooves. The concave grooves may be formed on the side of the screen either adjacent or away from the large lens. The image is focussed as sharply as possible upon these concave grooves. The lens is of the kind described in a paper by H. E. Ives entitled "Parallax Panoramagrams Made with a Large Diameter Lens" and published in the Journal of the Optical Society of America for June 1930 beginning at page 332. This lens is so large that it may be said to look around an object in the same way that a person looks around an object due to the spacing of his eyes. Elemental beams of light passing through elemental portions of the large lens are transmitted through the screen and the rays thereof diverge upon emerging from the concave cylindrical grooves. To cause planar diffusion of the incident elemental beams in a vertical direction, a ribbed sheet of transparent material such as glass or celluloid, in which the ribs or corrugations run at right angles to the concave cylindrical grooves of the screen, is placed between the lens and the screen and as close as possible to the screen. The divergent rays emerging from the concave cylindrical grooved surfaces appear to come from virtual image points located a short distance behind the grooved surfaces. A plurality of these virtual image points are formed corresponding to the numerous elemental beams coming from elemental portions of the object and transmitted through narrow strips of the large lens to the screen. The virtual image points behind each grooved surface taken together constitute a virtual image of the large lens. The virtual panoramagram formed by the plurality of these virtual images is photographed by means of a short focus photographic lens, in reduced size, upon a light sensitive film, forming a stereoscopic parallax panoramagram picture of the original object. The virtual strip images so photographed are correctly oriented right and left in contrast to the pseudoscopic images ordinarily produced by a large lens and opaque line grating. The parallax panoramagram picture produced in this manner may be placed in a projector which projects images of the panoramagrams upon the rear ridged surface of a lenticular translucent diffusing screen such as is shown in the patent of H. E. Ives No. 1,883,290 patented October 18, 1932. An observer viewing the front of the ridged screen sees stereoscopic relief pictures of the original object.

The large lens of the above mentioned illustrative arrangement may be replaced by a large strip concave mirror and a semi-transparent mirror in a modified embodiment of the invention. These mirrors form an image of the object as sharply as possible on the cylindrical grooves. Preferably a spherical concave mirror is used, if the picture is the same size as object. Otherwise an elliptical mirror is used with the object and image at the foci of the ellipse. The mirror is stopped down as much as possible in the vertical direction in order to improve the definition of the image. A mirror arrangement of this kind in combination with an opaque line grating is described in a paper by H. E. Ives entitled "Parallax Panoramagrams Made with a Large Diameter Concave Mirror" and published in the Journal of the Optical Society of America of November 1930 beginning on page 597. The type of parallax panoramgram produced with the mirror and opaque line grating, however, is pseudoscopic instead of stereoscopic.

A further modification of the taking arrangements above described involves the use of a large plano-convex lens positioned adjacent the flat surface of the concave cylindrical grooved screen and between it and the large diameter lens or mirror which focuses an image of the object upon the grooved screen. This plano-convex lens obviates the complication that the concave cylindrical grooves of the screen, which are far removed from the axis of the large diameter lens or mirror, will be only partially filled with light. This plano-convex lens can be chosen of such strength as to image the large diameter lens or mirror centrally in each concave groove of the concave cylindrical grooved screen. If the small photographic lens which photographs the virtual panoramic strip from the concave grooved screen, upon the motion picture film, is sufficiently far away, it will recieve some of the diverging rays from all points of the virtual strip image. By making the plano-convex lens still stronger so that it throws light from the large diameter lens or mirror into the small photographic lens from all points of the concave cylindrical grooved screen, the ribbed light diffusing sheet ordinarily placed back of the grooved screen may be dispensed with.

The invention will now be described more in detail with reference to the accompanying drawings.

Fig. 1 is a diagrammatic showing of an arrangement for taking stereoscopic parallax panoramagram pictures with a large lens;

Fig. 2 is a diagrammatic showing of one arrangement for the projection of a steroscopic parallax panoramagram pictures;

Fig. 3 is a detailed showing of a top view of the ridged screen shown in Fig. 1;

Fig. 4 is a detailed showing of a modification of the apparatus shown in Fig. 3;

Fig. 5 is a perspective showing of the ridged screen shown in Fig. 1;

Figure 6:
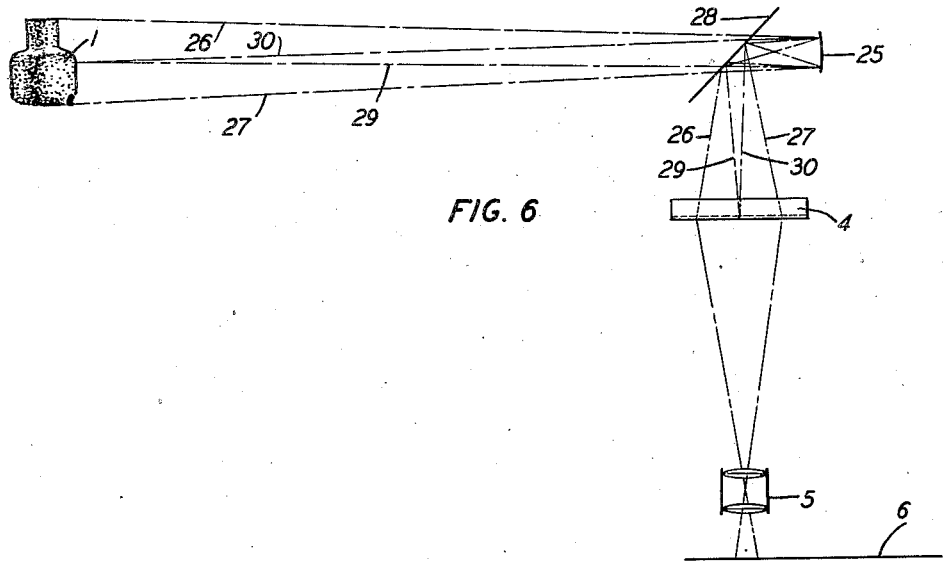
Fig. 6 is a diagrammatic showing of a modification of the taking apparatus shown in Fig. 1 using a large concave mirror.

Referring now to Fig. 1, a large diameter lens 2 is positioned to focus an image of an object 1 upon the concave cylindrical grooved surface 3 of the transparent screen 4. A small short focus photographic lens 5 photographs the image, formed on the grooved surface 3, upon the light sensitive emulsion 6. If the lens 2 is large enough to give sufficiently widely separated points of view of the object 1, it will be ordinarily of such long focus that its image will be very much larger than an ordinary lantern slide or motion picture film frame. Such is the case illustrated in Fig. 1. This difficulty is obviated by the use of the small short focus photographic lens 5 which photographs the image, in reduced size, upon the film or plate 6. A sheet of transparent material 7 is placed coincident with the flat surface of the screen 4. This sheet has one ribbed surface comprising a series of horizontal corrugations arranged side by side and running across the entire sheet. These ribs are positioned at right angles to the axes of the concave cylindrical grooves forming the grooved surface 3 of the screen 4, and cause vertical planer diffusion of the incident light rays. Unless this means is provided for vertically diffusing the incident light rays, the cylindrical concave grooved surface 3 of the screen 4 would appear from the photographic lens 5 simply as a horizontal strip of light.

The image photographed on the film 6 is of the stereoscopic parallax panoramagram type; that is, the film record consists of an infinity of narrow strip images which when viewed through an opaque line grating give a picture in stereoscopic relief. This infinity of strip images is formed from the single composite image of the object 1 projected by the large lens 2 upon the transparent screen 4. This multiple division of the single image which is focussed as accurately as possible on the grooved surface 3 of the screen 4, is effected by the plurality of concave cylindrical grooves forming the grooved surface 3. Each of these grooves acts as a lens element and forms a panorama of virtual strip images back of the grooved surface 3 of the large single image produced by the lens 2.

Under ordinary conditions the parallax panoramagram picture made with a large lens, such as the lens 2 in Fig. 1, would be of the pseudoscopic type due to the inverting action of the large lens, that is, the individual strips of the picture are inverted right for left. For projection in correct relief according to the methods of this invention, the parallax panoramagram should be of the stereoscopic type, that is, the strip images of the pseudoscopic parallax panoramagram would have to be oriented right for left to put them in their proper order. The action of the transparent screen 4 is to obviate the pseudoscopic effects and to produce instead a stereoscopic parallax panoramagram picture of the object 1, which is produced upon the plate or film 6.

Referring now to Fig. 2, the stereoscopic parallax panoramagram picture 6 of Fig. 1 is positioned in the projector 8. Positioned in front of the projector 8 and at a suitable distance is a transparent lenticular light diffusing viewing screen 9, of the type described in the patent of H. E. Ives, supra. The picture projector 8 projects images of the parallax panoramagram 6, upon the rear ridged surface 10 of the lenticular screen 9. These images if viewed from the opposite side of the screen in the direction indicated by the arrow will appear in stereoscopic relief.

The action of the screen 4 for producing stereoscopic parallax panoramagram pictures of the object 1 will be better understood from a consideration of the detailed showing of the screen in Fig. 3. Referring now to Fig. 3, two parallel beams 11 and 12 of incident light rays, coming from a large lens, such as lens 2 in Fig. 1, are seen to pass through the transparent members 7 and 4 and diverge upon emerging from the concave cylindrical groove 13, as shown by $\theta 1$ and $\theta 2$. The transparent horizontal ribbed sheet 7 causes vertical planar diffusion of the incident beams of light. If the paths of the divergent rays 14, 15 and 16, 17 are traced backward it is seen that they appear to come from virtual image points 18 and 19, respectively. In actual practice there are an infinity of these virtual image points formed behind each concave cylindrical groove of the screen 4, that is, behind each groove is formed a small virtual panorama. Now these panoramas, unlike those formed through a grating, in the manner disclosed in the paper by H. E. Ives entitled "Parallax Panoramagrams Made with a Large Diameter Lens" and published in the June, 1930 issue of the Journal of the Optical Society of America beginning on page 332, supra are not transposed right and left with respect to the object image but preserve the relative positions of the light beams on leaving the large lens. The virtual panoramic image formed by a plurality of these virtual images can be photographed if rays from each element of each strip image fall in the photographic lens, that is, the arrangement in Fig. 1 may be used to produce on film 6 a stereoscopic parallax panoramagram.

A modification of the screen of Fig. 3 is shown in Fig. 4. Referring now to Fig. 4, a parallel beam of light 20 coming from a large lens is seen to pass through the transparent screen 4 and diverge upon emerging from the concave groove 13, in a manner similar to that shown in Fig. 3. Here, however, instead of the transparent ribbed sheet 7, for vertically diffusing the incident light rays, a convex lens 24 is placed in contact with the flat side of the concave cylindrical grooved screen 4. Without the use of this lens or some similar means the grooves in the screen 4, far removed from the axis of the large lens, are only partially filled with light. The convex lens 24 obviates this complication by redirecting the peripheral light rays so that the grooves on the extreme edges of the screen 4 are filled with light. The function of this convex lens 24 will be understood better if considered in connection with a taking system such as shown in Fig. 1. The convex lens 24 can be chosen of such strength as to image the large lens 2 centrally in each groove 13 of the screen 4. If the lens 5 is then sufficiently far away, it will receive some of the diverging rays from all the points of the strip image. By making the convex lens 24 still stronger so that it throws light from the large lens 2 into the lens 5 from all points of the screen 4, the transparent ribbed sheet 7 may be dispensed with.

Referring to Fig. 5 the perspective drawings show the screen 4 in a vertical position with the concave cylindrical grooves 13 arranged side by side. The transparent ribbed sheet 7 is shown positioned behind the grooved screen 4 and having its ribbed surface of horizontal corrugations coincident with the flat rear surface of the screen 4. The horizontal ribs on the sheet 7 run in a direction at right angles to the axes of the vertically positioned concave cylindrical grooves 13 of the screen 4. During operation according to the arrangement shown in Fig. 1, a composite picture of the object 1 is projected by the large lens 2 upon the screen from the side of the ribbed sheet 7, and a short focus lens 5, photographs from the side of the concave cylindrical grooved surface 3, virtual strip images of the object 1 to form a stereoscopic parallax panoramagram on film 6, as hereinbefore described.

In Fig. 6 is shown a modification of the taking apparatus of Fig. 1. Here instead of using a large diameter lens like the lens 2 of Fig. 1, a large diameter spherical mirror 25 is used to image the object 1 from a wide angle of view. The extent of the angle through which a large diameter mirror can view an object is not as limited for practical reasons as that of a large lens. For all practical purposes a very large diameter mirror can be simply and economically made. The operation of the taking apparatus in Fig. 6 will be better understood by tracing the paths of the boundary light rays from the object 1 to the mirror 25 and from the latter to the grooved screen 4 and from the screen to the motion picture film 6 where they produce stereoscopic parallax panoramagrams. The boundary rays 26 and 27 emananting from the object 1 are transmitted through a semi-transparent reflector 28 which is positioned at 45° to the center axis of the object 1. The rays 26 and 27 after transmission through the semi-transparent reflector 28 strike the large diameter concave cylindrical strip mirror 25, only a narrow cross-section of which is shown here. The mirror 25 reflects these rays 26 and 27 back upon the semi-transparent reflector 28 which has a mirror-like reflecting surface upon the side toward the large concave mirror 25. Mirror 25 and semi-transparent reflector 28 are of the type disclosed in the paper by H. E. Ives, entitled "Parallax Panoramagrams Made with a Large Concave Mirror" published in the November, 1930 issue of the Journal of the Optical Society of America, supra. The reflected rays 26 and 27 strike the mirror-like reflecting surface of the semi-transparent reflector 28 and are directed downward upon the transparent concave cylindrical grooved screen 4, which is identical with the screen 4 of Fig. 1. The rays after transmission through the screen 4 pass through the photographic lens 5 and onto the film 6. The rays 26 and 27 as described represent only boundary rays in one plane from the boundaries of the object 1 and in between these rays are an infinity of intermediate similar directed rays. The parallax panoramagram picture produced on the film 6 by this method is in its properties and utilization exactly like that produced by the large lens 2 and screen 4 of the taking apparatus in Fig. 1; that is, it is a stereoscopic parallax panoramagram having the proper orientation of its strip images for correct relief projection in the arrangement of Fig. 2.

Figure 7:
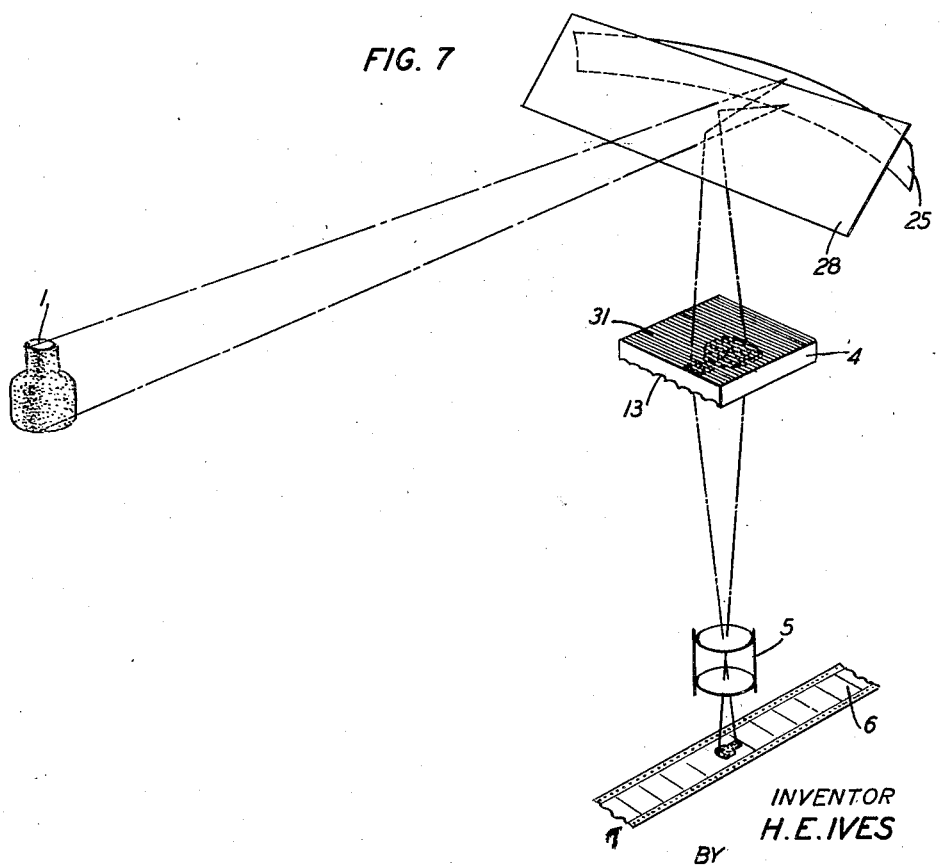
Fig. 7 is a perspective showing of the taking apparatus shown in Fig. 6.

Fig. 7 shows a perspective view of the taking apparatus of Fig. 6. This will give a clearer idea of the relative sizes and space relationships of the component parts of the system. The large diameter concave cylindrical strip mirror 25 views the object 1 through an angle of approximately 60°. This mirror 25 has a concave spherical curvature, since it represents a strip sector of a large spherical mirror. In practice the effective width of the concave mirror 25 is very small, that is, only a very narrow strip, of the order of one inch or less is used. The narrower the strip, the greater will be its depth of focus and the sharper will be the focusing action of the mirror. In setting up systems for actually making stereoscopic parallax panoramagram pictures according to the methods of this invention, the following dimensions will be of convenience; the length of the mirror 25 approximately five feet, its effective width after being stopped-down about one inch, the object 1 about 8" x 3", the semi-transparent reflector 28 about 5' x 1½', and the concave cylindrical grooved screen 4 about 10" x 12" x 1". These sizes are not critical and could be varied substantially within practical operating limits. The screen 4 is shown here with its concave cylindrical grooves 13 vertically positioned, that is, vertical with respect to the images produced upon them. These grooves are on the side of the screen 4 which face the small photographic lens 5. On the opposite side of the screen 4 is shown the horizontal corrugations 31 forming a series of ribs, which lie at right angles to the axes of the vertically positioned grooves 13. In this arrangement the ribs 31 are formed directly upon the surface of the screen 4 and not upon a separate transparent sheet like the sheet 7 placed coincident with the screen 5, as shown in Fig. 1. The effective use of these horizontal ribs is the same whether placed directly on the screen 4 or on a sheet placed coincident with the screen. The parallax panoramagram pictures produced on the film 6 of Fig. 7 are of the stereoscopic type and suitable for correct relief projection on the rear of a lenticular screen such as shown in Fig. 2.

The term "planar diffusion" applies to such diffusion of the rays of an elemental beam of light that the rays which lie in a given plane before diffusion all lie in the same plane after diffusion. The rays of the elemental beam may or may not be parallel to one another before diffusion takes place. They are not parallel, of course, after diffusion.

The terms "vertical" and "horizontal" are used in this specification in the same sense that they are used when it is said that the columns of a newspaper are vertical and the lines horizontal. In this sense these terms are used without reference to the absolute position of the paper in space.

The term "stereoscopic parallax panoramagram" as used in this specification signifies a parallax panoramagram which has an orientation of the elemental portions of each panoramic strip such as is obtained by exposing a photographic emulsion through an opaque line grating fixed with respect to the photographic emulsion and slightly separated from it by means of a lens moved around the object; that is, the element of any panoramic strip corresponding to the right hand aspect of the object is located nearest to the left hand side of the object as pictured. Such a stereoscopic parallax panoramagram and camera for producing the exposure is described in a paper by H. E. Ives entitled "A Camera for Making Parallax Panoramagrams" published in the Journal of the Optical Society of America for December 1928 beginning at page 435. As hereinbefore stated, the negatives produced according to the present invention are stereoscopic parallax panoramagram negatives.

The scope of this invention is to be limited only by the appended claims.

What is claimed is:

1. In a system for producing pictures for viewing in stereoscopic relief, means for forming a composite image of an object from a plurality of points of view, means for forming from said composite image a plurality of virtual image points representing strip images of said object, and means for photographing said plurality of virtual images to form a stereoscopic parallax panoramagram.

2. In a system for producing pictures for viewing in stereoscopic relief, means for forming a single composite image of an object from a wide angle of view, lenticular means for forming from said single image a plurality of virtual strip images, and means to photograph said plurality of virtual images to form a stereoscopic parallax panoramagram.

3. In apparatus for producing stereoscopic parallax panoramagrams, means to form an image of an object by light rays converging through a wide angle, a screen of transparent material located substantially in the image space, said screen having concave cylindrical grooves on the face away from said image forming means and parallel light diffusing ribs on the opposite side substantially at right angles to said grooves, and means to photograph said screen from the grooved side.

4. In apparatus for producing stereoscopic parallax panoramagrams, means to form an image of an object by light rays converging through a wide angle, and a screen of transparent material located substantially in the image space, said screen being formed by two sheets of transparent material placed coincident with each other, one of said sheets having a series of horizontal ribs formed upon one surface and the other of said sheets having a series of vertical concave cylindrical grooves arranged side by side on one surface away from said image forming means.

5. In apparatus for producing a stereoscopic parallax panoramagram, means to form an image of an object by light rays converging through a wide angle, a screen of transparent material located substantially in the image space, said screen having concave cylindrical grooves on the face away from said image forming means and a plano-convex lens on the opposite side to reduce the convergence of said image forming rays, and means to photograph said screen from the grooved side.

6. In a system for producing pictures for viewing in stereoscopic relief, apparatus comprising a large diameter lens for imaging an object from a plurality of points of view, means for forming a plurality of virtual images of said large lens corresponding to elemental portions of the object, and means for photographing said plurality of virtual images to form a stereoscopic parallax panoramagram.

7. In apparatus for producing stereoscopic parallax panoramagrams, a large diameter lens for forming a composite image of an object from a plurality of points of view, and a screen of transparent material located in said image space, one face of said screen comprising vertical cylindrical grooves to form virtual images of said large lens and the other face comprising horizontal ribs to cause planar diffusion of elemental light beams.

8. In apparatus for producing stereoscopic parallax panoramagrams, a large diameter lens for forming a composite image of an object from a plurality of points of view, a screen of transparent material located in said image space, one face of said screen comprising vertical cylindrical grooves to form virtual images of said large lens, and a plano-convex lens located with the plane face adjacent the other face of said screen.

9. In a system for producing pictures for viewing in stereoscopic relief, apparatus comprising a large diameter concave spherical strip mirror for imaging an object from a plurality of points of view, means for changing the direction of the reflected light rays to position the image produced by said mirror outside the beam of incident rays, means for forming a plurality of virtual images of said mirror corresponding to elemental portions of said object, and means for photographing said plurality of virtual images to form a stereoscopic parallax panoramagram.

10. In a system for producing pictures for viewing in stereoscopic relief, a large diameter concave strip mirror for focusing an image of an object from a wide angle of view, a semi-transparent plane reflector placed at approximately forty-five degrees to the center axis of said mirror, and a transparent lenticular screen for forming a plurality of virtual strip images of said concave mirror.

11. In apparatus for producing stereoscopic parallax panoramagrams, an elongated strip sector of a spherical concave mirror for forming a composite image of an object from a plurality of points of view, and a screen of transparent material located in said image space, one face of said screen comprising vertical cylindrical grooves to form virtual images of said elongated mirror sector and the other face comprising horizontal ribs to cause planar diffusion of elemental light beams.

12. In apparatus for producing stereoscopic parallax panoramagrams, an elongated strip sector of a spherical concave mirror for forming a composite image of an object from a plurality of points of view, a screen of transparent material located in said image space, one face of said screen comprising vertical cylindrical grooves to form virtual images of said elongated mirror sector, and a plano-convex lens located with the plane face adjacent to the other face of said screen.

13. In a system for producing pictures for viewing in stereoscopic relief, a large diameter concave strip mirror for focusing an image of an object from a wide angle of view, a semi-transparent plane reflector placed at approximately forty-five degrees to the center axis of said mirror, a transparent lenticular screen for forming a plurality of virtual strip images of said concave mirror, and means for photographing said plurality of virtual strip images to form a stereoscopic parallax panoramagram picture of the original object.

HERBERT E. IVES.